United States Patent
Nespolo et al.

(10) Patent No.: US 9,522,676 B2
(45) Date of Patent: Dec. 20, 2016

(54) SITUATION AWARENESS ASSISTANT FOR VEHICLE CONTROL

(71) Applicants: DENSO International America, Inc., Southfield, MI (US); DENSO CORPORATION, Kariya-shi (JP)

(72) Inventors: Martin Nespolo, Grosse Pointe Woods, MI (US); Kyle Golsch, Pontiac, MI (US); Sibu Varughese, Sterling Heights, MI (US); Vikas Upmanue, Farmington Hills, MI (US); Yu Zhang, Troy, MI (US); Justin McBride, South Lyon, MI (US); Laith Daman, Novi, MI (US); Cary Horvath, Dearborn, MI (US); Thomas Krzyzak, Jr., Livonia, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/669,799

(22) Filed: Mar. 26, 2015

(65) Prior Publication Data
US 2015/0314783 A1 Nov. 5, 2015

Related U.S. Application Data

(60) Provisional application No. 61/986,518, filed on Apr. 30, 2014.

(51) Int. Cl.
*B60W 30/095* (2012.01)
*B60W 50/14* (2012.01)

(52) U.S. Cl.
CPC ........ *B60W 30/095* (2013.01); *B60W 30/0953* (2013.01); *B60W 30/0956* (2013.01); *B60W 50/14* (2013.01); *B60W 2050/146* (2013.01)

(58) Field of Classification Search
CPC .......................... B60W 30/0956; B60W 50/14
(Continued)

(56) References Cited

U.S. PATENT DOCUMENTS 6,442,484 B1 * 8/2002 Miller ................. B60R 21/0134
340/990
8,511,841 B2 8/2013 Varaprasad et al.
(Continued)

FOREIGN PATENT DOCUMENTS

EP 0840138 A1 5/1998
EP 2613572 A1 7/2013
(Continued)

OTHER PUBLICATIONS

Office Action dated May 17, 2016 issued in the corresponding KR application No. 10-2015-0060699 in Korean with English translation.

*Primary Examiner* — Fadey Jabr
*Assistant Examiner* — Yazan Soofi
(74) *Attorney, Agent, or Firm* — Harness, Dickey & Pierce, P.L.C.

(57) ABSTRACT

A system for informing a driver of a vehicle of a surrounding hazard and road position of the vehicle. The system includes at least one sensor configured to identify location of the hazard relative to the vehicle. A controller is configured to: receive inputs from the at least one sensor regarding location of the hazard; determine a threat potential of the hazard based on at least one of location of the hazard relative to the vehicle, speed of the vehicle, and heading of the vehicle; and send commands to a display for visually displaying the hazard to the driver based on the determined threat potential of the hazard.

21 Claims, 11 Drawing Sheets

(58) Field of Classification Search
USPC .................................. 701/301; 340/435, 436
See application file for complete search history.

(56) References Cited

U.S. PATENT DOCUMENTS

| | | | |
|---|---|---|---|
| 2003/0122930 A1* | 7/2003 | Schofield | B60R 1/00 348/148 |
| 2007/0010944 A1* | 1/2007 | Ferrebee | G08G 1/166 701/301 |
| 2008/0040004 A1* | 2/2008 | Breed | B60R 21/0134 701/45 |
| 2009/0037088 A1* | 2/2009 | Taguchi | B60W 30/095 701/117 |
| 2010/0123778 A1* | 5/2010 | Hada | B60R 1/00 348/148 |
| 2012/0062745 A1* | 3/2012 | Han | B62D 15/029 348/148 |
| 2012/0299713 A1* | 11/2012 | Elia | B60W 30/0956 340/435 |
| 2015/0160653 A1* | 6/2015 | Cheatham, III | G05D 1/0088 701/23 |
| 2015/0348417 A1* | 12/2015 | Ignaczak | G08G 1/166 340/435 |

FOREIGN PATENT DOCUMENTS

| | | |
|---|---|---|
| KR | 20060021452 A | 3/2006 |
| KR | 20070076835 A | 7/2007 |

\* cited by examiner

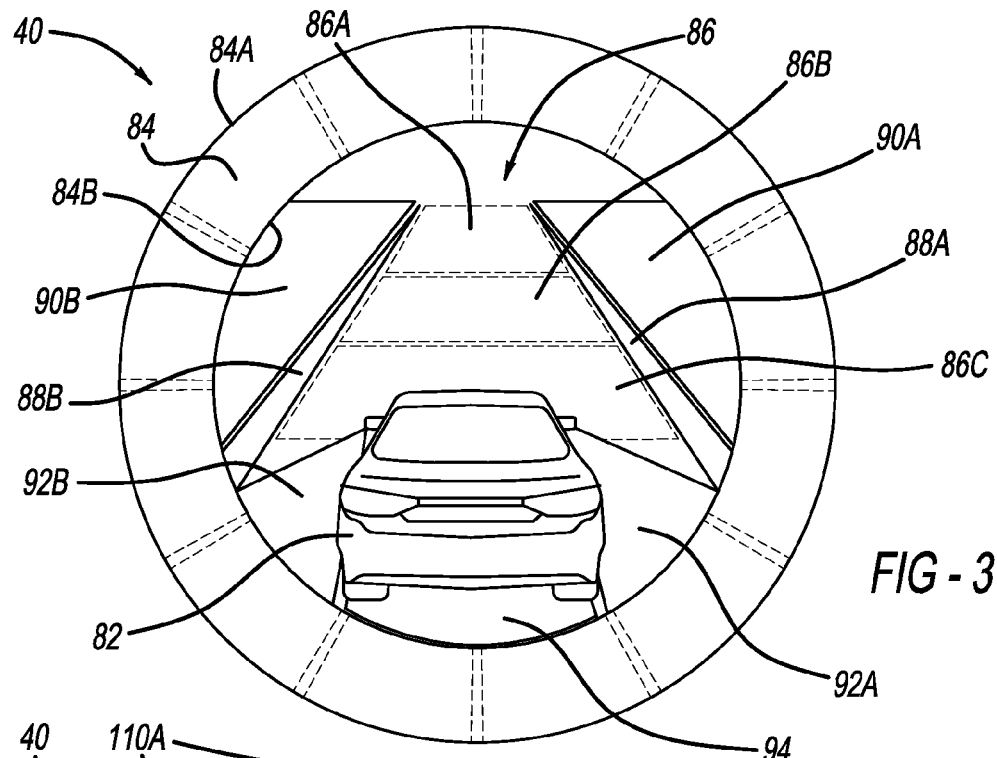
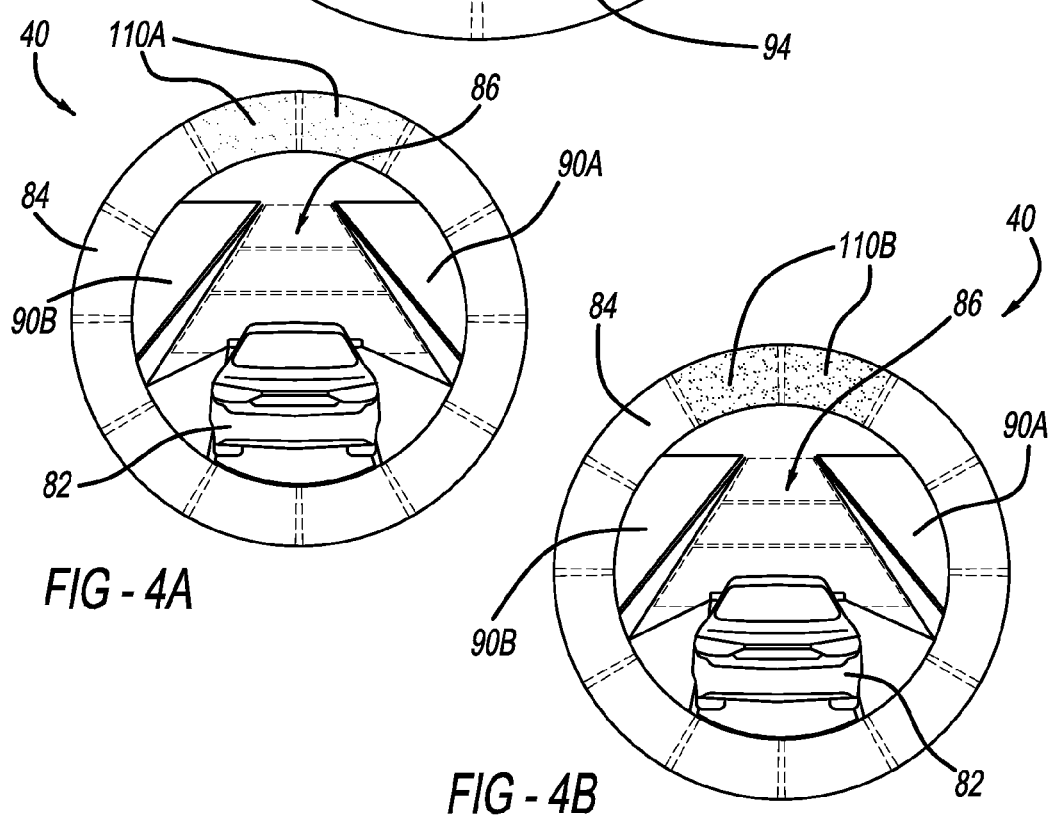
FIG - 3
FIG - 4A
FIG - 4B

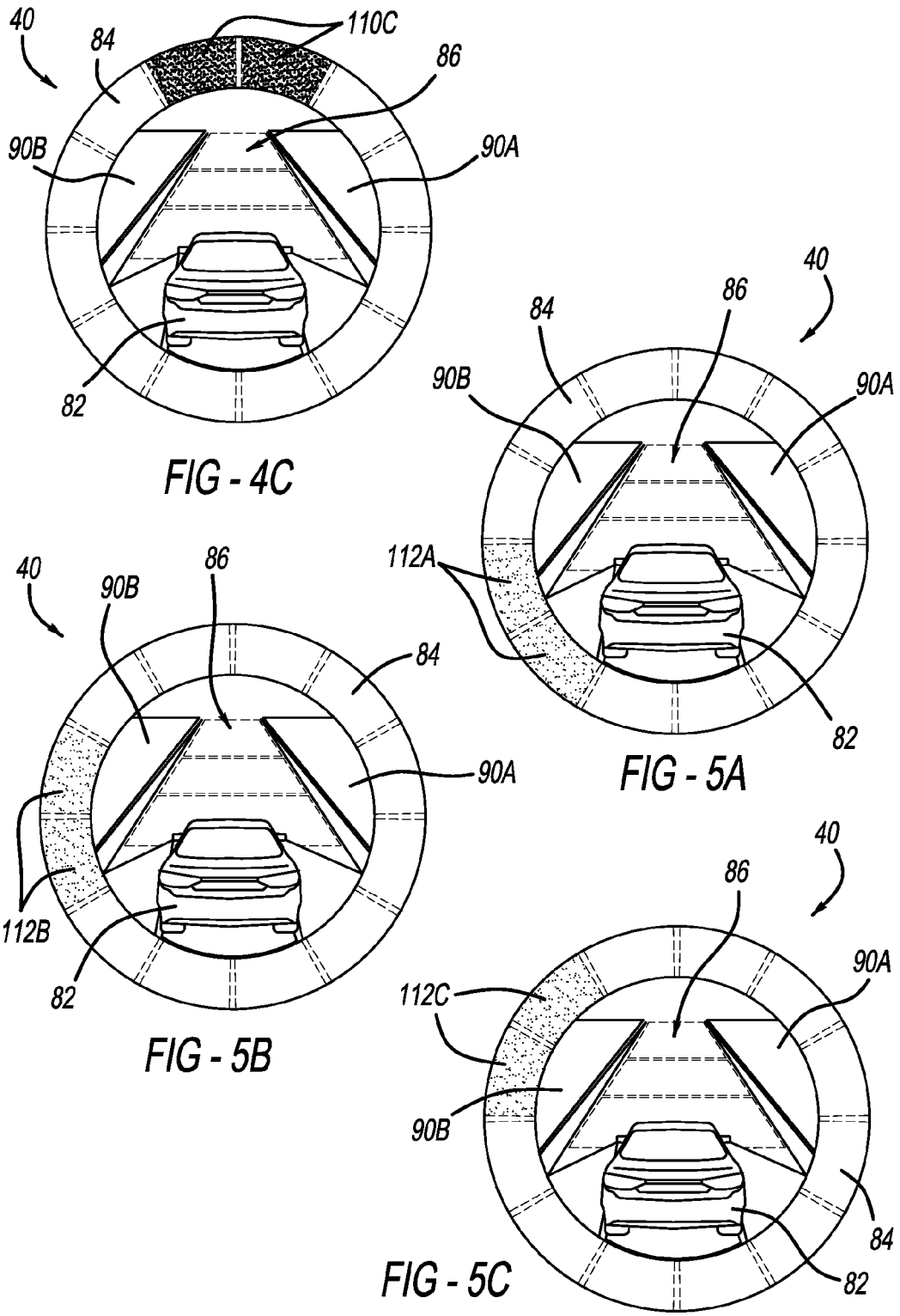

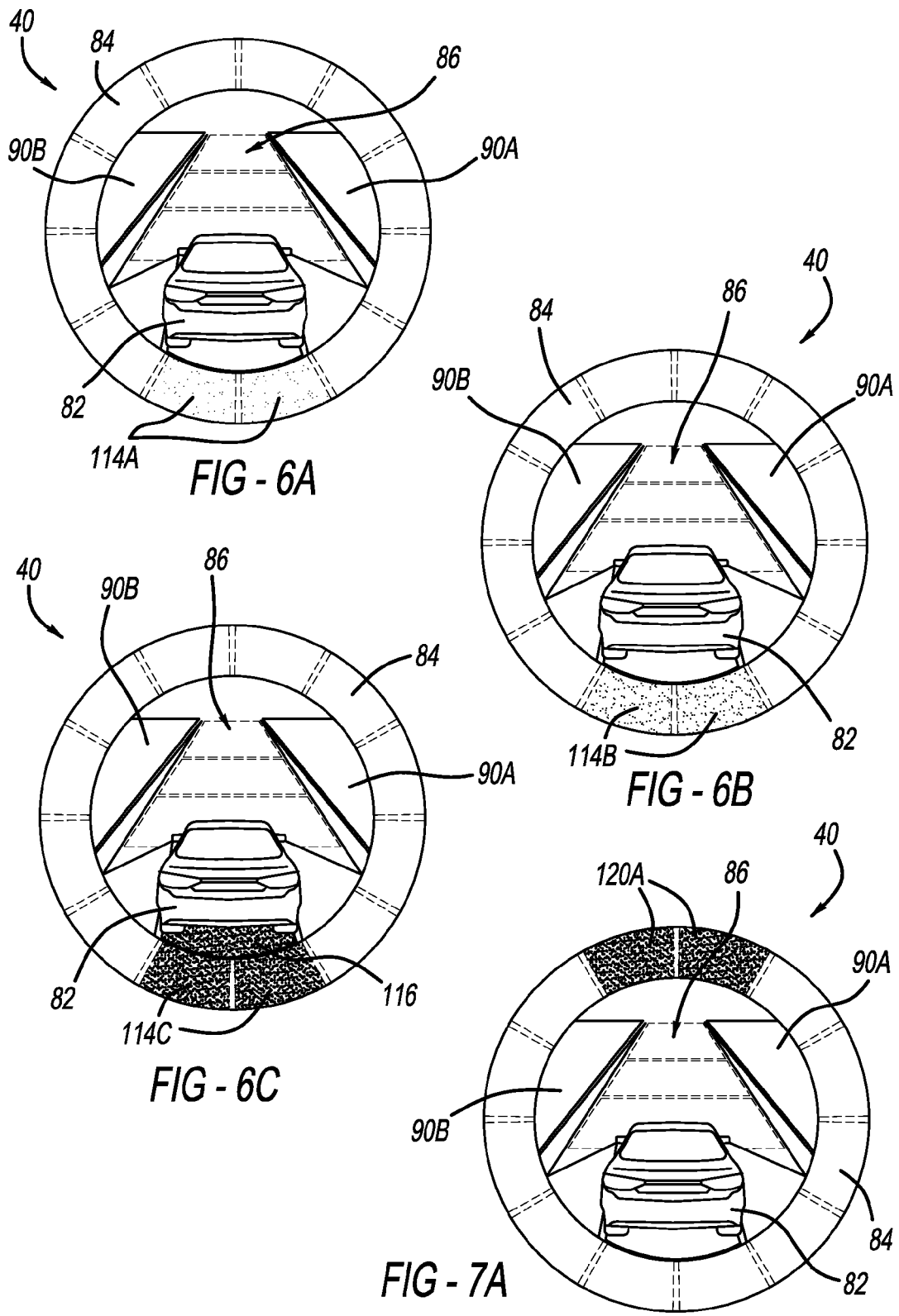

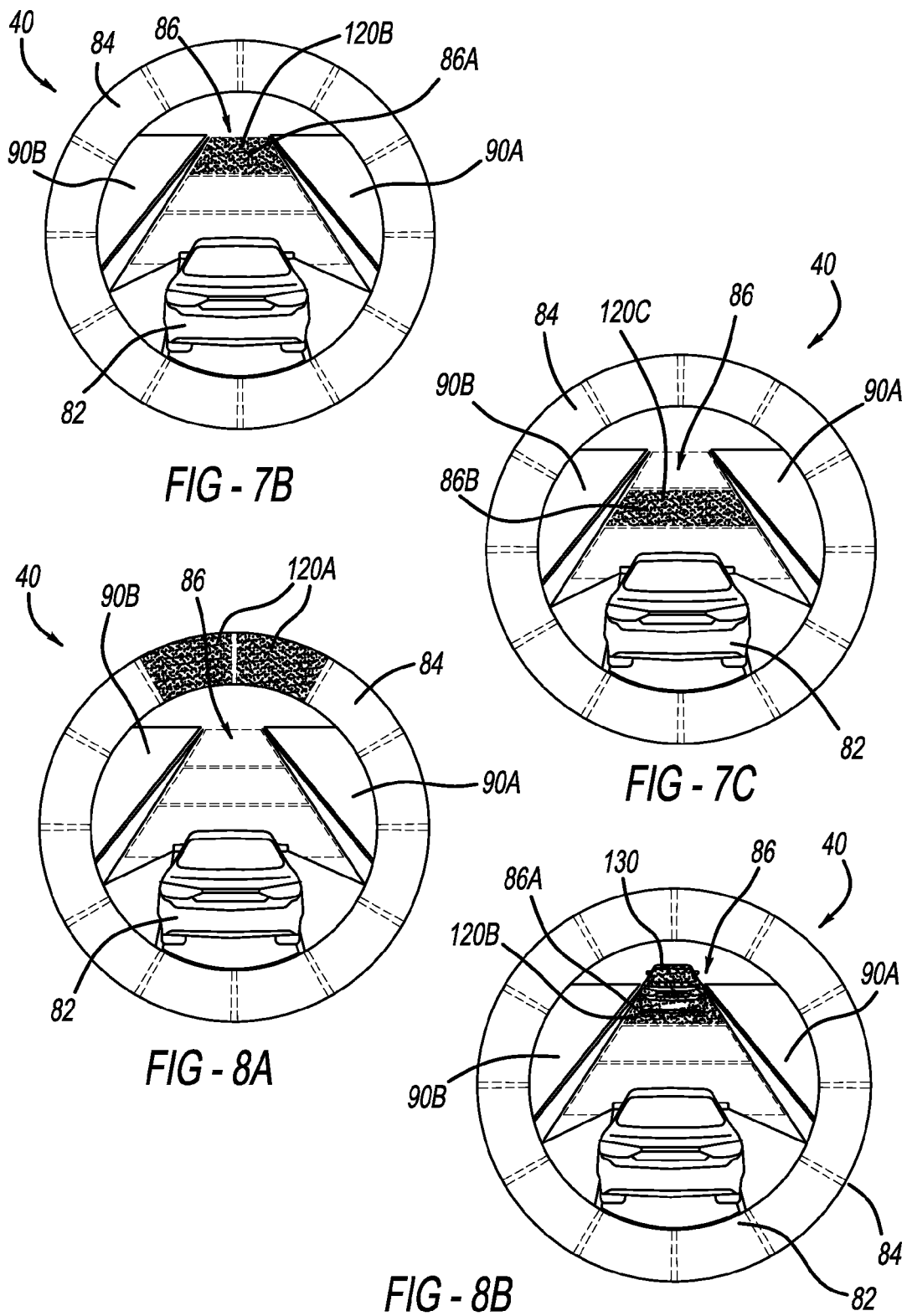

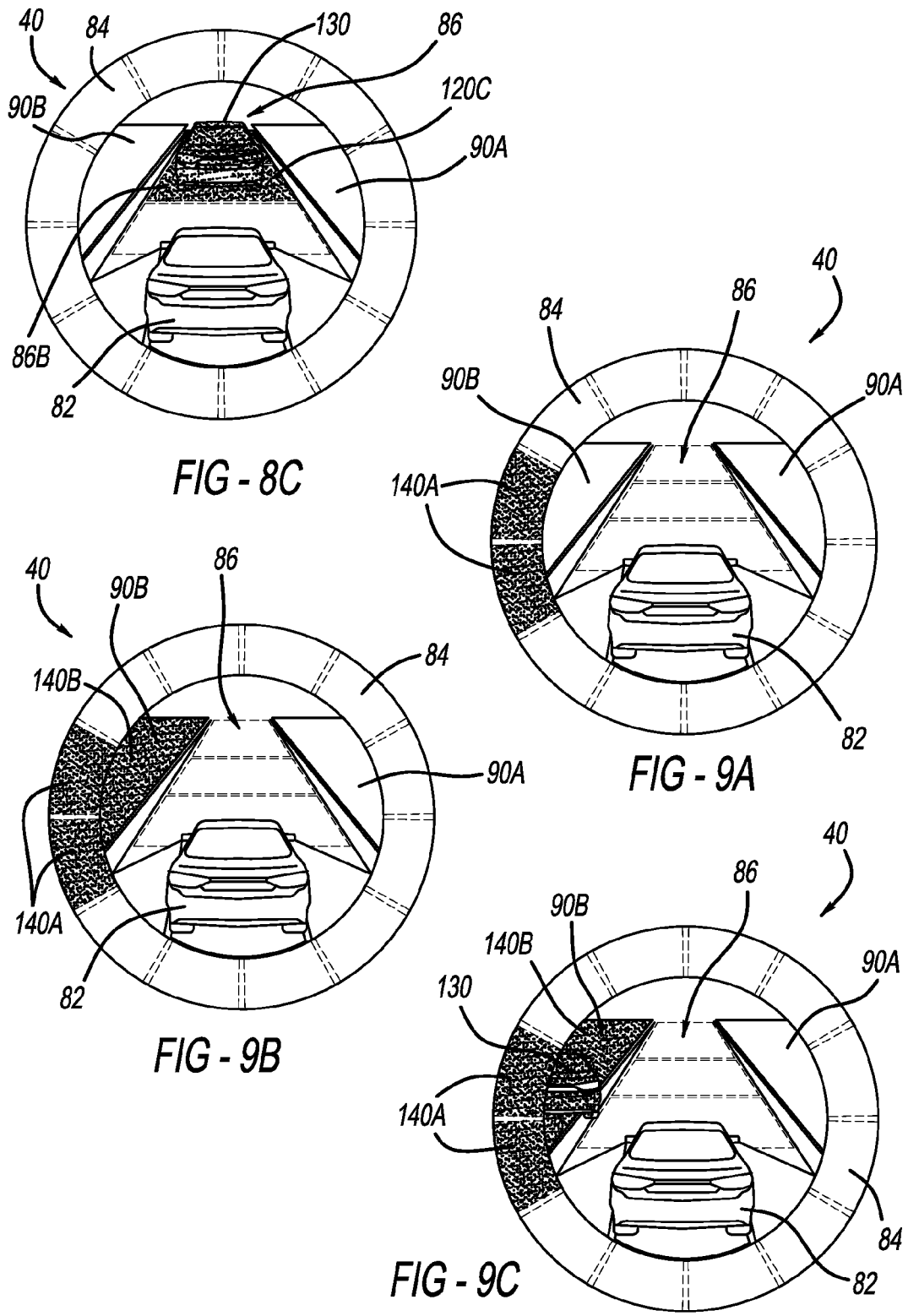

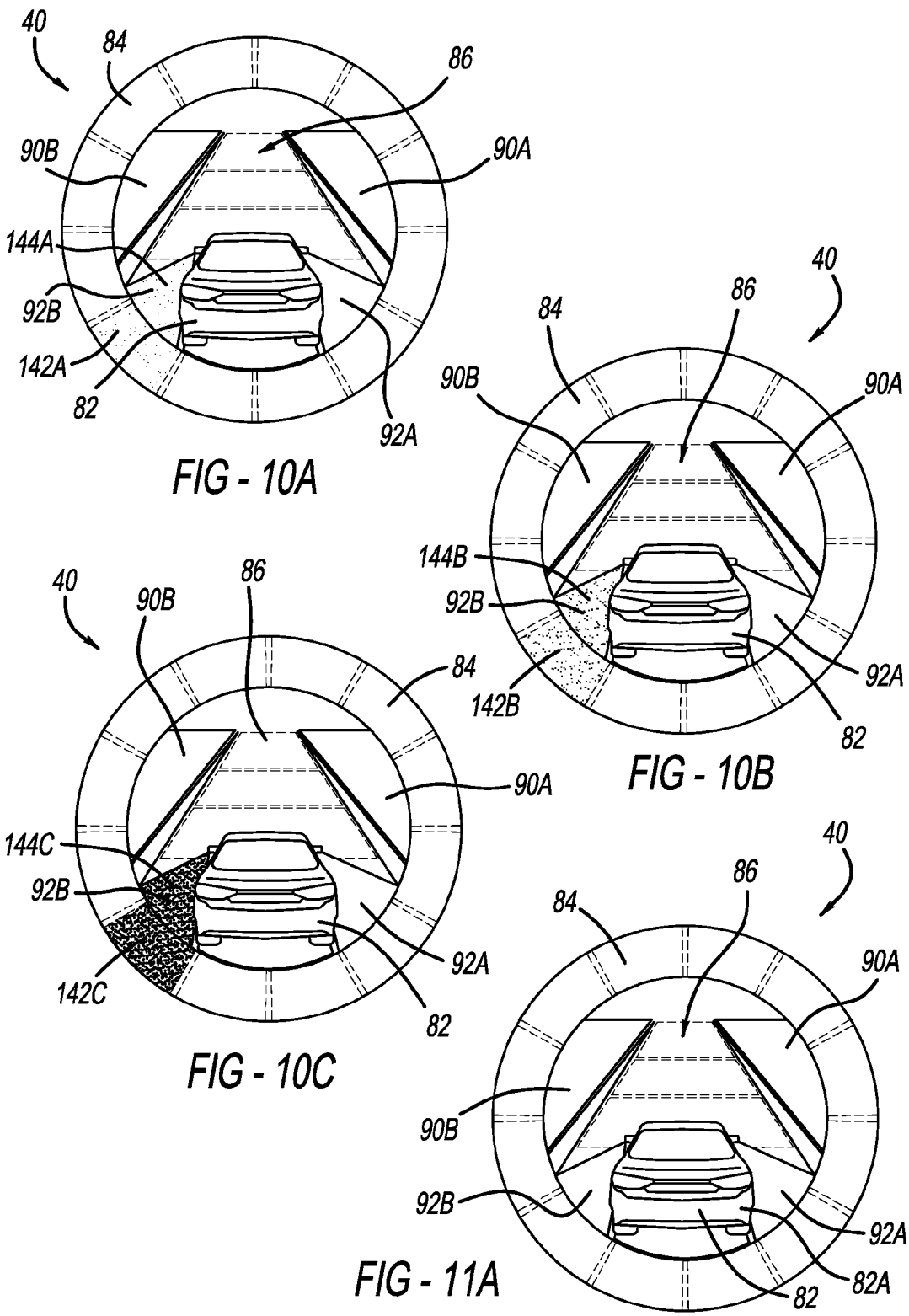

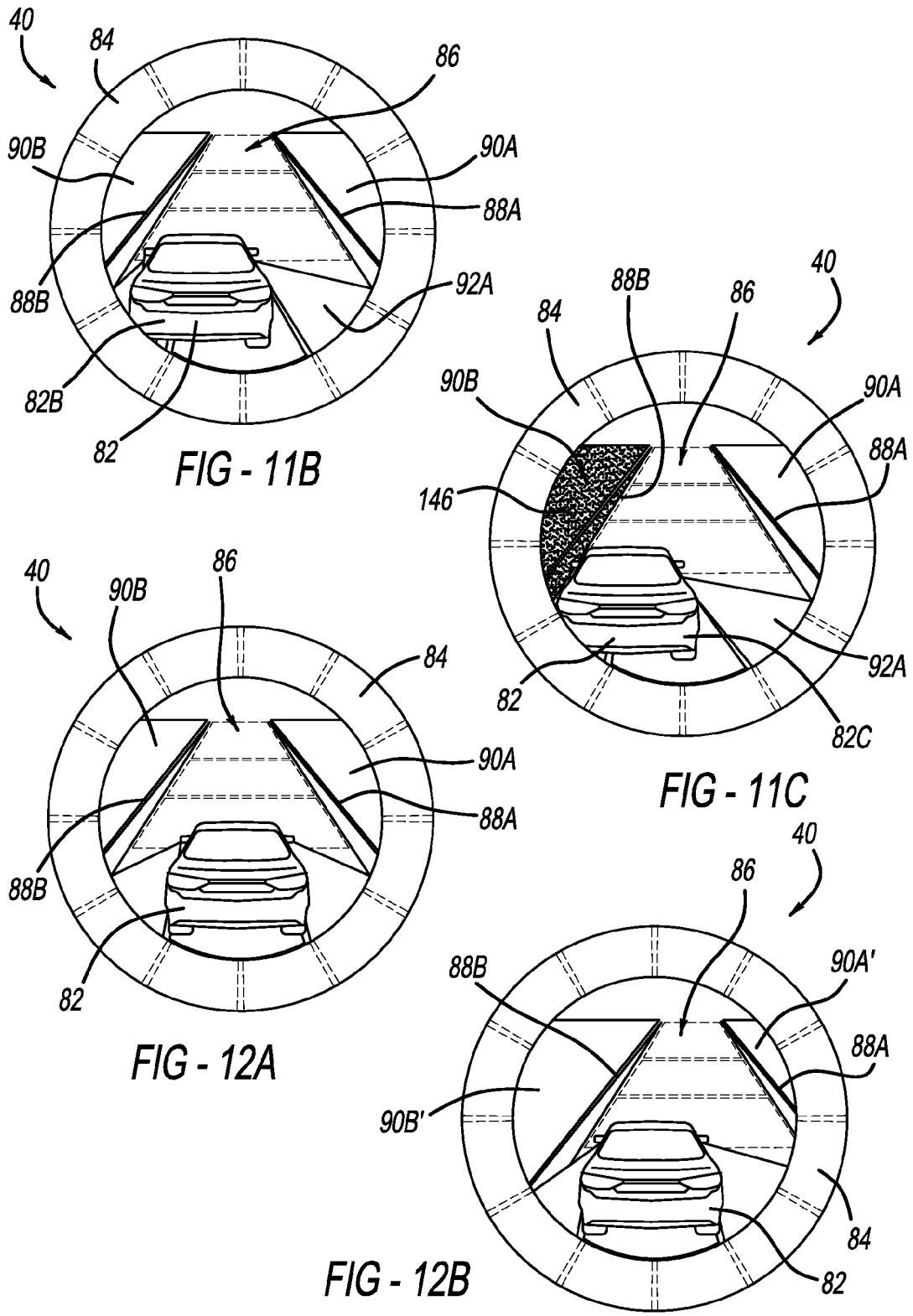

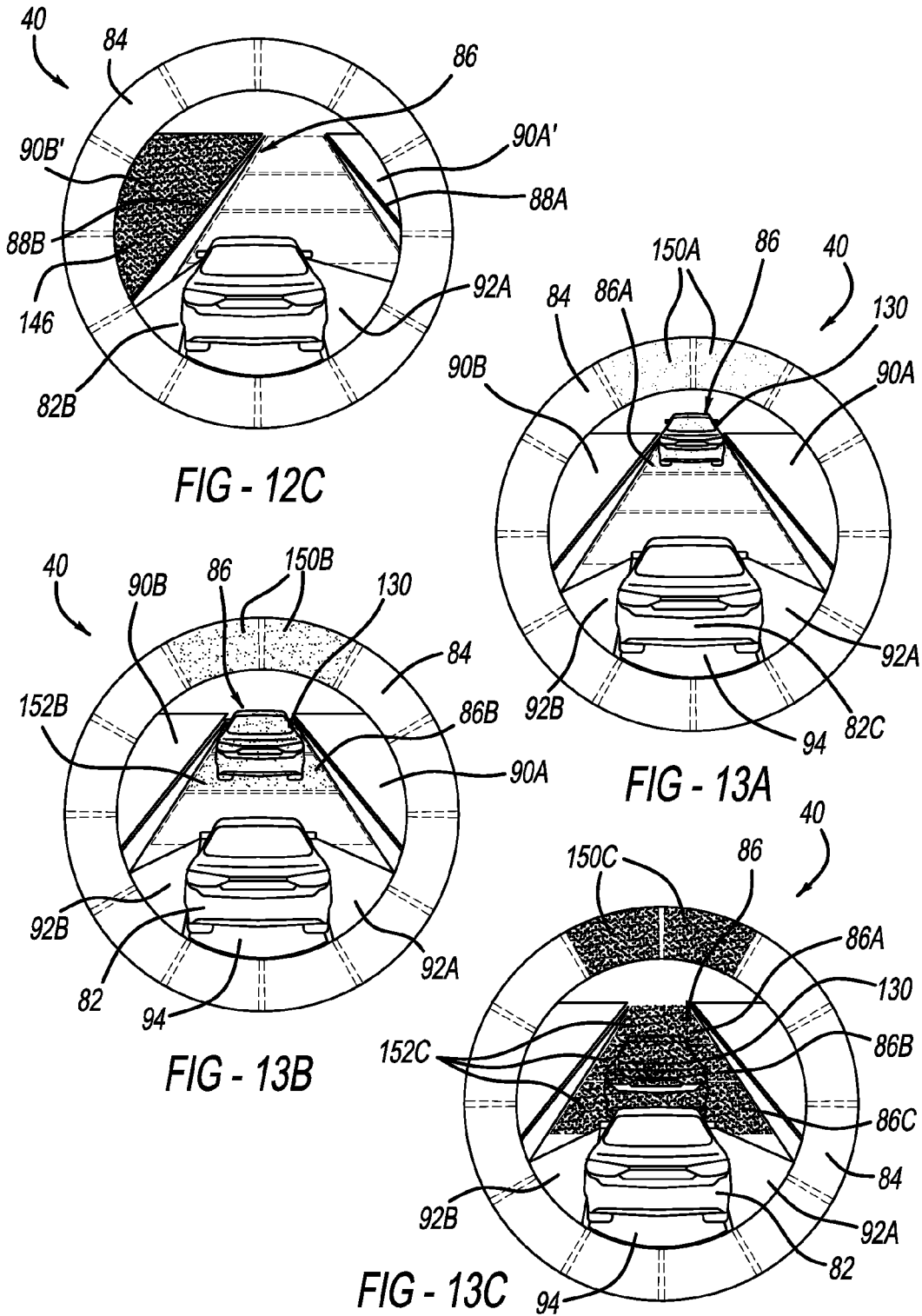

SITUATION AWARENESS ASSISTANT FOR VEHICLE CONTROL

CROSS-REFERENCE TO RELATED APPLICATION

This application claims the benefit of U.S. Provisional Patent application No. 61/986,518 filed on Apr. 30, 2014, the entire disclosure of which is incorporated herein by reference.

FIELD

The present disclosure relates to a situation awareness system for facilitating operation of a vehicle by a driver.

BACKGROUND

This section provides background information related to the present disclosure, which is not necessarily prior art.

Advanced Driver Assistant Systems (ADAS) are becoming increasingly available as options on vehicles as warning systems. Although current systems are suitable for their intended use, they are subject to improvement. For example, an ADAS warning system capable of conveying safety information to a driver in a clear and uncluttered manner would be desirable. In addition, while current ADAS systems are able to enhance driver perception of immediate hazards, they are unable to provide drivers with high level comprehension of driving situations, such as to assist drivers with anticipating future driving conditions and driving states. A system able to provide high-level support for driver situational awareness to reduce driver workload and promote safer and more efficient driving maneuvers would thus be desirable.

To facilitate comprehension of the driving environment, it would be desirable to design the timing and layout of situational warnings to match a driver's mental models. At the same time, it would be desirable to filter raw information to avoid nuisance warnings or over presentation of an obstacle or other object, such as surrounding traffic, in order to not distract the driver. Current ADAS systems often rely on only a single sensor without integrated consideration of roadway conditions. Further, warning messages delivered by prior ADAS systems are not always well-received by drivers, and are therefore subject to improvement.

The present teachings address the deficiencies in the art set forth above, as well as numerous others. For example, the present teachings improve driver situational awareness by: 1) displaying graphics and animation that matches a driver's mental model of the roadway; and 2) integrating sensor information, roadway information, and vehicle status to facilitate awareness of surrounding traffic.

SUMMARY

This section provides a general summary of the disclosure, and is not a comprehensive disclosure of its full scope or all of its features.

The present teachings provide for a system for informing a driver of a vehicle of a surrounding hazard and road position of the vehicle. The system includes at least one sensor configured to identify location of the hazard relative to the vehicle. A controller is configured to: receive inputs from the at least one sensor regarding location of the hazard; determine a threat potential of the hazard based on at least one of location of the hazard relative to the vehicle, speed of the vehicle, and heading of the vehicle; and send commands to a display for visually displaying the hazard to the driver based on the determined threat potential of the hazard.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 illustrates an exemplary ISAD according to the present teachings;

FIG. 4A illustrates the ISAD of FIG. 3 displaying a primary alert representing a vehicle or obstacle ahead of the driver within a comfort zone;

FIG. 4B illustrates the ISAD of FIG. 3 displaying a secondary alert representing a vehicle or obstacle ahead of the driver within the comfort zone;

FIG. 4C illustrates the ISAD of FIG. 3 displaying a tertiary alert representing a vehicle or obstacle ahead of the driver within the comfort zone;

FIG. 5A illustrates the ISAD of FIG. 3 displaying a primary alert representing a vehicle or obstacle at a left rear of the driver within the comfort zone;

FIG. 5B illustrates the ISAD of FIG. 3 displaying a primary alert representing a vehicle or obstacle on a left side of the driver within the comfort zone;

FIG. 5C illustrates the ISAD of FIG. 3 displaying a primary alert representing a vehicle or obstacle on a front left side of the driver within the comfort zone;

FIG. 6A illustrates the ISAD of FIG. 3 displaying a primary alert representing a vehicle or obstacle at a rear of the driver within the comfort zone;

FIG. 6B illustrates the ISAD of FIG. 3 displaying a secondary alert representing a vehicle or obstacle at a rear of the driver within the comfort zone;

FIG. 6C illustrates the ISAD of FIG. 3 displaying a tertiary alert representing a vehicle or obstacle at a rear of the driver within the comfort zone;

FIG. 7A illustrates the ISAD of FIG. 3 displaying an alert representing a vehicle or obstacle ahead of the driver within the comfort zone;

FIG. 7B illustrates the ISAD of FIG. 3 displaying an alert representing a vehicle or obstacle ahead of the driver at a distal forward safety zone;

FIG. 7C illustrates the ISAD of FIG. 3 displaying an alert representing a vehicle or obstacle ahead of the driver at a medial forward safety zone;

FIG. 8A illustrates the ISAD of FIG. 3 displaying an alert representing a vehicle or obstacle ahead of the driver within the comfort zone;

FIG. 8B illustrates the ISAD of FIG. 3 displaying an alert including a vehicle icon representing a vehicle ahead of the driver at a distal forward safety zone;

FIG. 8C illustrates the ISAD of FIG. 3 displaying an alert including a vehicle icon representing a vehicle ahead of the driver at a medial forward safety zone;

FIG. 9A illustrates the ISAD of FIG. 3 displaying an alert representing a vehicle or obstacle on a left side of the driver within the comfort zone;

FIG. 9B illustrates the ISAD of FIG. 3 displaying the alert of FIG. 9A and an alert representing a vehicle or obstacle within a left safety zone;

FIG. 9C illustrates the ISAD of FIG. 3 displaying the alerts of FIG. 9B, and a vehicle icon within the left safety zone representing a vehicle on the left side of the driver within the safety zone;

FIG. 10A illustrates the ISAD of FIG. 3 displaying a primary alert representing a vehicle or obstacle in the driver's left blind spot;

FIG. 10B illustrates the ISAD of FIG. 3 displaying a secondary alert representing a vehicle or obstacle in the driver's left blind spot;

FIG. 10C illustrates the ISAD of FIG. 3 displaying a tertiary alert representing a vehicle or obstacle in the driver's left blind spot;

FIG. 11A illustrates the ISAD of FIG. 3 displaying the driver's vehicle at a first position midway between left and right lane markers;

FIG. 11B illustrates the ISAD of FIG. 3 displaying the driver's vehicle at a second position closer to the left lane marker than the first position;

FIG. 11C illustrates the ISAD of FIG. 3 displaying the driver's vehicle at the second position of FIG. 11B, and an alert at a left safety zone indicating that the driver is about to cross the left lane marker;

FIG. 12A illustrates the ISAD of FIG. 3 displaying a forward safety zone, a right safety zone, and a left safety zone at a first position relative to an icon representing the driver's vehicle;

FIG. 12B illustrates the ISAD of FIG. 3 displaying the forward safety zone, the right safety zone, and the left safety zone at a second position relative to the icon representing the driver's vehicle, the second position shifted to the right of the first position;

FIG. 12C illustrates the ISAD of FIG. 3 displaying the forward, right, and left safety zones in the second position of FIG. 12B, and an alert at a left safety zone indicating that the driver is about to cross the left lane marker;

Figure 14:
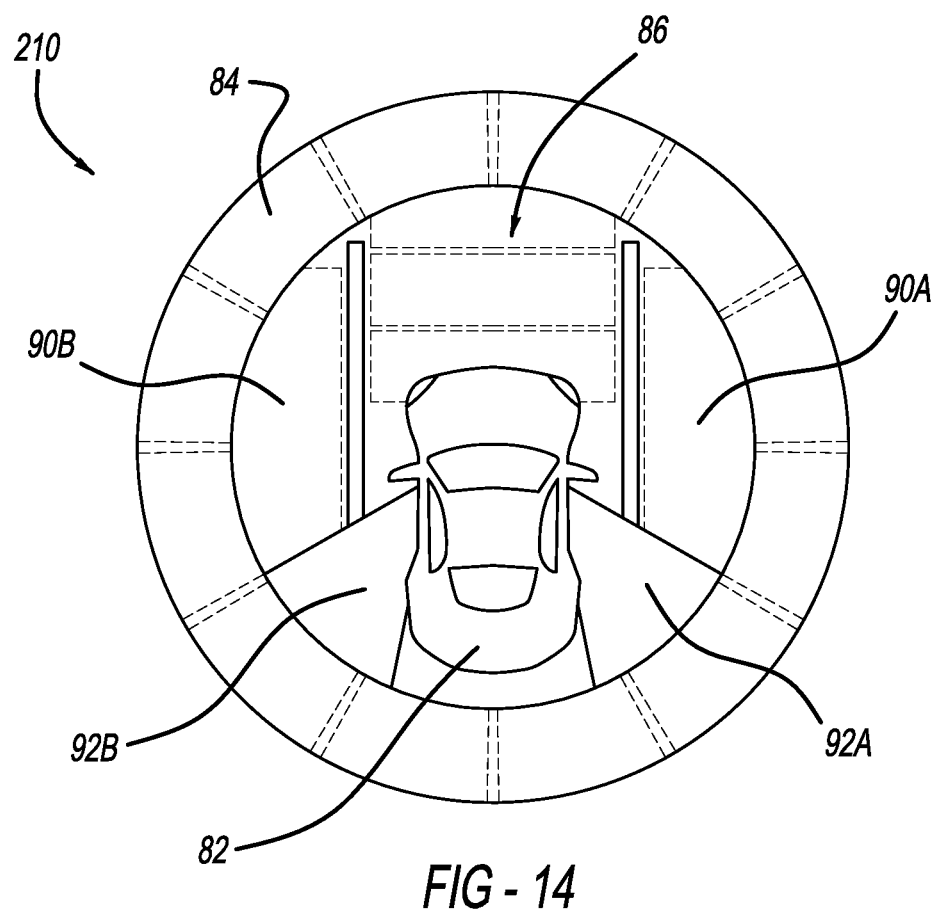

FIG. 13A illustrates the ISAD of FIG. 3 displaying a primary alert indicating that a vehicle is within the driver's safety zone at a distal forward portion of the safety zone, the primary alert including illumination of a forward portion of the comfort zone that occurs only when the vehicle has entered the safety zone, illumination of the distal forward safety zone, and a vehicle icon at the distal forward safety zone representing the vehicle ahead;

FIG. 13B illustrates the ISAD of FIG. 3 displaying a secondary alert indicating that a vehicle is within the driver's safety zone at a medial forward portion of the safety zone, the secondary alert including illumination of a forward portion of the comfort zone that occurs only when the vehicle has entered the safety zone, illumination of the medial forward safety zone, and a vehicle icon at the medial forward safety zone representing the vehicle ahead;

FIG. 13C illustrates the ISAD of FIG. 3 displaying a tertiary alert indicating that a vehicle is within the driver's safety zone at a proximal forward portion of the safety zone, the tertiary alert including illumination of a forward portion of the comfort zone that occurs only when the vehicle has entered the safety zone, illumination of the proximal forward safety zone, and a vehicle icon at the proximal forward safety zone representing the vehicle ahead; and FIG. 14 illustrates another ISAD according to the present teachings, the ISAD of FIG. 14 is generally the ISAD of FIG. 3 presented in two-dimensional plan view.

Corresponding reference numerals indicate corresponding parts throughout the several views of the drawings.

DETAILED DESCRIPTION

Example embodiments will now be described more fully with reference to the accompanying drawings.

Figure 1:
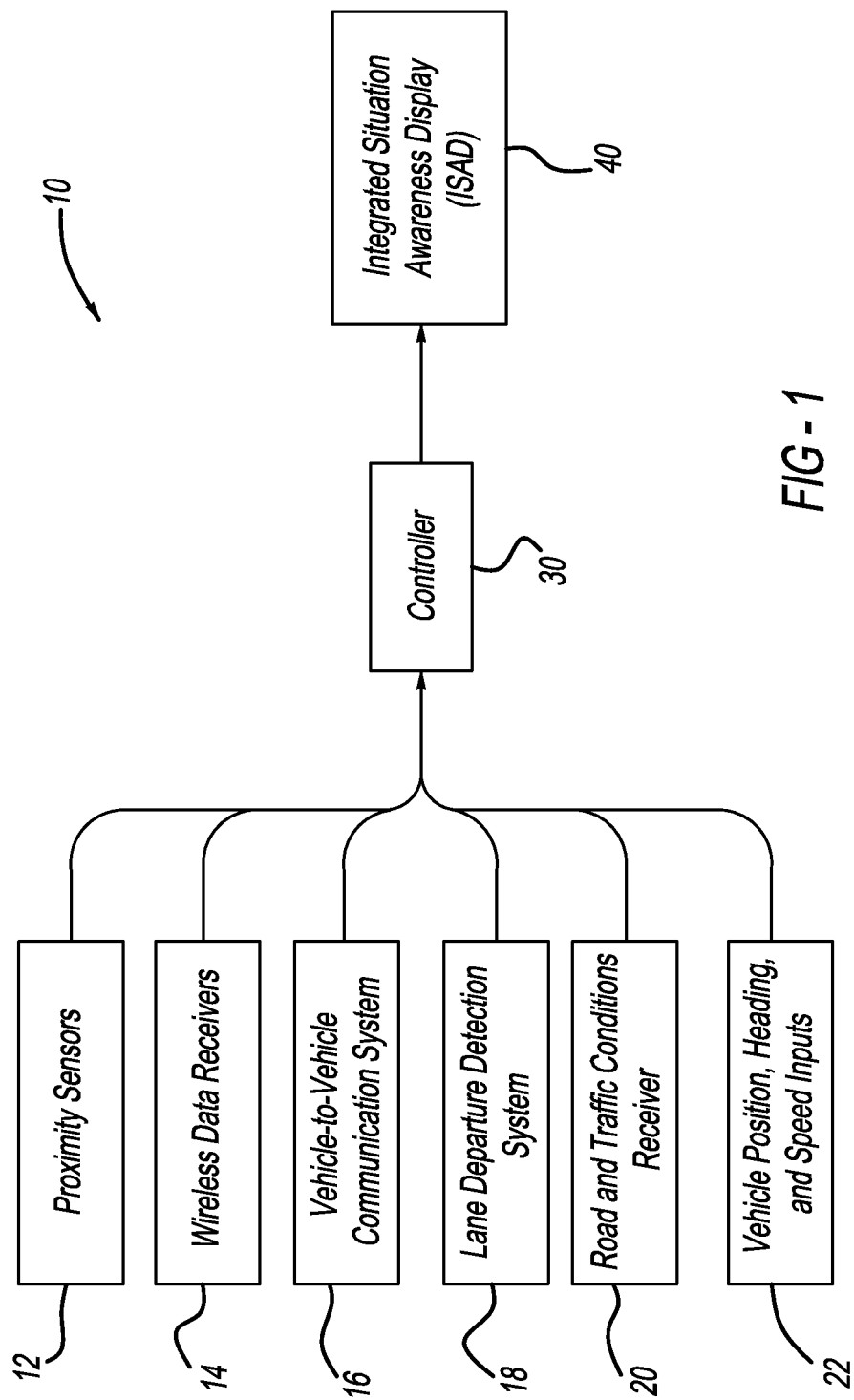
FIG. 1 is a schematic of a system according to the present teachings for informing a driver of surrounding hazards and road position.

With initial reference to FIG. 1, a system for informing a driver of surrounding hazards and road position of the driver's vehicle is generally illustrated at reference numeral 10. The system 10 includes a plurality of proximity sensors 12, which can be mounted to the driver's vehicle or any suitable obstacle constituting a hazard to the vehicle, such as a building, a bridge, a wall, other vehicles, etc. The proximity sensors 12 can be any type of sensor suitable to measure distance between the driver's vehicle and surrounding hazards. The proximity sensors 12 can be, for example, ultrasonic sensors, electromagnetic sensors, capacitive sensors, infrared sensors, radar based sensors, sonar sensors, or any other type of suitable sensor.

The system 10 can further include wireless data receivers 14 configured to receive signals emanating from transmitters mounted to hazards proximate to the driver's vehicle, the transmitters broadcasting location information of the hazards. The system 10 can further include a vehicle-to-vehicle communication system 16, which can be configured to provide communication between the driver's vehicle (the vehicle being operated by the user of the system 10) and surrounding vehicles to identify the location of the surrounding vehicles relative to the driver's vehicle. The driver's vehicle may also include a lane departure detection system 18, configured to detect when the vehicle is straying from within its current lane. The system 10 can further include a road and traffic conditions receiver 20. The receiver 20 being any suitable receiver configured to receive road and/or traffic conditions broadcast in any suitable manner, such as by satellite (such as satellite radio) or ground based transmitters.

The system 10 can further include any suitable inputs 22 identifying position, heading, and/or speed of a driver's vehicle. The inputs 22 can be generated in any suitable manner by any suitable device or system. For example, the inputs may be data received from the vehicle's GPS receiver identifying the vehicle's location, a compass mounted to the vehicle, and/or a speedometer of the vehicle.

The system 10 may include any one or more of the items at reference numerals 12-22 of FIG. 1, as well as any other suitable devices or systems configured to generate data regarding hazards surrounding a vehicle, road conditions, and/or operational/directional parameters of the vehicle.

The system 10 can further include a controller 30 configured to receive inputs from any one or more of the items 12-22, as well as any other inputs regarding the operating status of the vehicle and/or surrounding hazards. The controller 30 can be any suitable controller, such as any suitable controller including a processor configured to read instructions stored within a memory of the controller 30 or a remote memory. For example, the controller 30 can be any suitable CPU on board a vehicle of a driver using the system 10, the controller 30 can be remote to the vehicle, or the controller 30 can be a smart device of a user of the system 10, such as the user's smartphone, tablet computer, laptop computer, or any other suitable computing device.

The controller 30 is configured to receive and analyze inputs from the items 12-20, assess relative importance of the inputs to safe operation of the vehicle, and based on the inputs from the items 12-20 identify potential threats to safe operation of the vehicle, such as based on proximity to the driver's vehicle, direction of travel of the driver's vehicle and/or surrounding vehicles, and traveling speed of the driver's vehicle and/or surrounding vehicles. The controller 30 can be configured to apply different criteria for assessing safety threats based on any suitable parameters, such as traffic density, road conditions, road characteristics (e.g., school zone), etc. The threat assessment criteria can be changed based on a driver's habits, and thus the controller 30 can be configured to learn the driver's habits through any suitable machine learning process. For example, if the driver has a history of aggressive driving, the controller 30 may be configured to provide early alerts regarding potential hazards in order to give the driver more time to react. If the driver is young and/or inexperienced, the controller 30 may also be configured to provide early alerts. The controller 30 can further be configured to set and modify warning thresholds based on road conditions. For example, if road conditions are poor, such as due to snow, ice, rain, etc., the controller 30 may be configured to reduce warning thresholds. The controller 30 can also be configured to filter multiple obstacles detected and rank them in order of importance, to only instruct the ISAD 40 to display obstacles that are most relevant at a particular time, so as to not overload the driver with alerts.

The controller 30 may be configured to define various zones about the vehicle, such as a comfort zone and/or a safety zone. The comfort zone is generally a first distance from the vehicle and the safety zone is generally a second distance from the vehicle that is less than the first distance. When hazards are within the comfort zone but outside the safety zone, the driver can comfortably avoid the hazard and the hazard is not considered an immediate threat. When hazards are the safety zone, the time pressure to avoid the hazards is greater and the driver must typically react quickly. The controller 30 may also define a critical zone, whereby the driver must react immediately with precise and correct maneuvers to avoid hazards within the critical zone. Using the one or more of the inputs from the items 12-22, the controller 30 is able to identify hazards as being in the safety, comfort zone, or critical zone, or any other defined zone. The controller 30 may modify the size and positions of the zones based any suitable parameters, such as traffic conditions, road conditions, and/or driver experience, for example.

The present teachings further provide for an integrated situation awareness display (ISAD) 40. The ISAD 40 can be any suitable display accessible to a driver/user of the system 10. For example, the ISAD 40 can be a display of the driver's personal electronic device, such as a driver's smartphone, or a display in a passenger cabin 50 (FIG. 2) of the driver's vehicle. The controller 30 can be configured to drive or operate the ISAD 40 to display information to the driver, such as any suitable warning information based on inputs to the controller 30 from one of more of the elements 12-22.

Figure 2:
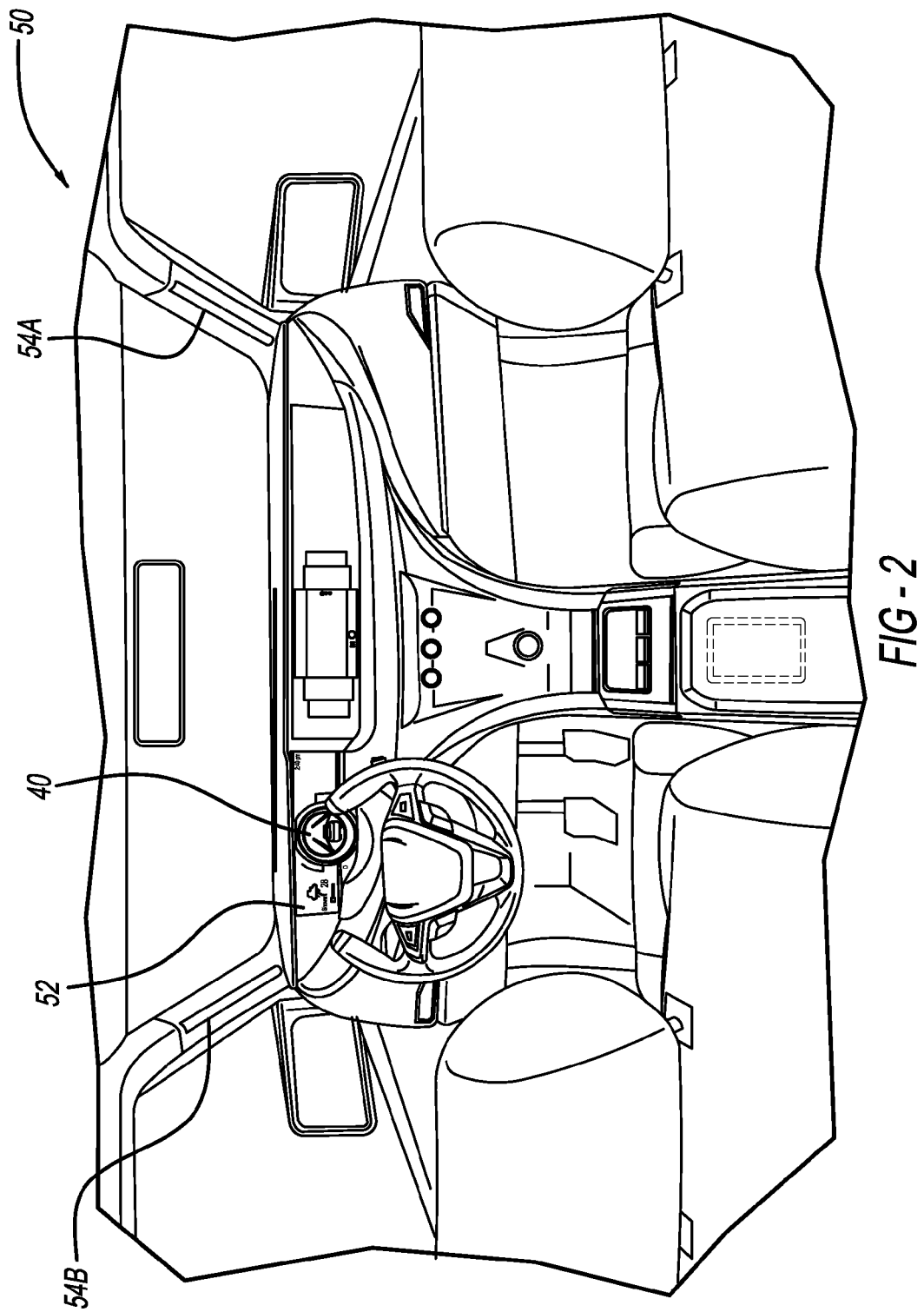
FIG. 2 illustrates a vehicle passenger cabin including an integrated situation awareness display (ISAD) according to the present teachings.

With reference to FIG. 2, the passenger cabin 50 is an exemplary passenger cabin of a vehicle including the ISAD 40 at a dashboard display 52. The ISAD 40 can be located at any other suitable position within the passenger cabin 50. For example, the ISAD 40 can be a heads-up display (HUD). The passenger cabin 50 further includes a right indicator 54A and a left indicator 54B, which can be located at any suitable positions about the passenger cabin 50. For example, and as illustrated, the right indicator 54A can be at a right A-pillar of the passenger cabin 50, and the left indicator 54B can be at a left A-pillar of the passenger cabin 50. The right and left indicators 54A and 54B can be any suitable indicators configured to alert the driver, and any passengers of the passenger cabin 50, to other vehicles and/or obstacles on a right hand side or a left hand side respectively of the vehicle. For example, the right and left indicators 54A and 54B can be lights of any suitable type and color, such as red LED lights. The right and left indicators 54A and 54B can operate in conjunction with the ISAD 40 in order to provide alerts to the driver and passengers. For example, upon detection of another vehicle and/or obstacle in close proximity at a right hand side of the vehicle, the right indicator 54A can illuminate. Similarly, upon identification of a vehicle and/or obstacle on a left hand side of the vehicle, the left indicator 54B can illuminate. Both indicators 54A and 54B can illuminate to indicate presence of a vehicle and/or obstacle at a front and/or rear of the vehicle. The right and left indicators 54A and 54B can illuminate in any suitable manner, such as in the form of a constant illumination or a blinking illumination. Detection of vehicle and/or obstacles can be performed in any suitable manner, such as with one or more of the proximity sensors 12, the wireless data receivers 14, the vehicle-to-vehicle communication system 16, or any other suitable receivers or system.

With reference to FIG. 3, features of an exemplary ISAD 40 will now be described in detail. The ISAD 40 generally includes a vehicle icon 82 representing a vehicle of the driver/user of the system 10. The vehicle icon 82 is surrounded by a comfort zone 84, which with this exemplary ISAD 40 is a circular zone surrounding the vehicle icon 82 defined by an outer ring 84A and an inner ring 84B. Although the comfort zone 84 is illustrated as circular, the comfort zone 84 can have any other suitable shape, such as but not limited to a square shape or a rectangular shape. The comfort zone 84 represents a zone about the driver's vehicle set by the controller 30 in which the presence of other vehicles and/or obstacles do not present a significant safety threat to the driver and his/her vehicle.

The comfort zone 84 can be at any suitable distance from the driver's vehicle, such as at a predetermined distance or a customized distance. Any suitable distance can be set, such as, for example, a distance such that based on the driver's speed, direction heading, road conditions, as well as the speed and direction of another vehicle and/or obstacle, the vehicle/obstacle is about 2 to about 4 seconds away from the driver's vehicle as calculated by the controller 30. The range of the comfort zone 84 can be, for example, 1-3 car lengths. Traffic density can also be taken into account when calculating the comfort zone 84. For example, a smaller comfort zone 84 can be set in traffic jam conditions, and a larger comfort zone 84 can be set in, for example, a school zone. The left and right borders of the comfort zone 84 can be at the left and right lanes adjacent to the driver's vehicle, and thus the comfort zone 84 can include at least a portion of adjacent traffic lanes to the right and left of the driver's vehicle.

The comfort zone 84 can be divided into a plurality of sections, such as evenly spaced sections as illustrated, which can illuminate to represent the presence of a vehicle and/or obstacle at a corresponding position about the driver's vehicle. Comfort zone 84 can illuminate in any suitable color and with any suitable intensity, such as corresponding to the distance and/or safety concern that the vehicle and/or obstacle presents.

Within the comfort zone 84 is a forward safety zone 86. The forward safety zone 86 includes a distal forward safety zone 86A, a medial forward safety zone 86B, and a proximate forward safety zone 86C. The forward safety zone 86 is arranged ahead of the vehicle icon 82. The distal forward safety zone 86A is furthest from the vehicle icon 82, and the proximate forward safety zone 86C is closest to the vehicle icon 82. The medial forward safety zone 86B is between the distal and proximate forward safety zones 86A and 86C. The forward safety zone 86 is between a right lane marker 88A and a left lane marker 88B representing the right and left lane lines of the particular road lane that the driver is driving in, as detected in any suitable manner, such as by the lane departure detection system 18. On a right hand side of the right lane marker 88A is a right safety zone 90A, and on a left hand side of the left lane marker 88B is a left safety zone 90B.

The safety zones 86, 90A, and 90B can be set by the controller 30 in any suitable manner, and can be set to a predetermined distance or can be varied in any suitable manner, such as based on traffic conditions, road conditions, driver age/experience, etc. The front outer border of the forward safety zone 86 can be predefined as two seconds time headway (calculated as the bumper-to-bumper distance divided by the current vehicle speed), for example. The left/right outer border of the safety zone can be the left/right lane marker 88A/88B. The range of the outer border of the safety zone, such as the forward safety zone 86, can be one car length of the driver/host vehicle, for example. The range of the comfort zone can be greater than one car length and up to about three car lengths.

The ISAD 40 further includes a right blind spot safety zone 92A and a left blind spot safety zone 92B. Behind the vehicle is a rear safety zone 94. The positions and distances of the right and left blind spot safety zones 92A and 92B, as well as the rear safety zone 94, can be set by the controller 30 in any suitable manner, and can be any suitable size, shape, and distance.

The ISAD 40 can be configured to alert the driver of surrounding vehicles and/or other objects in any suitable manner. If the sensors, systems, and devices identified in FIG. 1 at reference numerals 12-22, for example, are configured to detect and differentiate different objects to be avoided, the ISAD 40 can be configured to display icons representing such objects, such as icons representing a vehicle, a pedestrian, and/or a barrier, for example, which will assist the driver in comprehending and dealing with any potential safety issue.

One or more of the areas of the ISAD 40 described above, such as the areas 84-94 can be illuminated and/or highlighted in any suitable manner in order to identify the location of and/or the relevance of any surrounding vehicle and/or object. For example, a multi-level color scheme may be used to indicate the proximity of and/or relevance of a surrounding object.

For example and with initial reference to FIG. 4A, when the controller 30 identifies, based on inputs thereto, a relevant vehicle or other object ahead of the driver within the comfort zone 84 at a first distance, the controller 30 can instruct the ISAD 40 to display a primary alert 110A in the comfort zone 84 ahead of the vehicle icon 82. The primary alert 110A can be any suitable color or any suitable intensity. With reference to FIG. 4B, when based on inputs to the controller 30, the controller 30 determines that the object of interest is at a second position closer to the driver's vehicle than the first position, the controller 30 can instruct the ISAD 40 to display a secondary alert 110B in the comfort zone 84. The secondary alert 110B can be a greater intensity than, and/or different color than, the primary alert 110A in order to make it clear to the driver that the object of interest is closer to the vehicle than when primary alert 110A was displayed. For example, primary alert 110A can be a green alert, and secondary alert 110B can be a yellow alert. With reference to FIG. 4C, when the controller 30 determines that the object of interest is at a third position closer to the driver's vehicle then when in the second position, the controller 30 can instruct the ISAD 40 to generate a tertiary alert 110C in the comfort zone 84. The tertiary alert 110C can be, for example, a red alert and/or of a greater intensity as compared to alerts 110A and 110B to signify to the driver that the object of interest is now even closer to the driver's vehicle. The primary, secondary, and tertiary alerts 110A, 110B, and 110C may all be of the same color rather than different colors, for example, but may have different intensities. For example, the primary alert 110A can be emitted at a low intensity, the secondary alert 110B can be emitted at a medium intensity, and the tertiary alert 110C can be emitted at a high intensity.

With reference to FIG. 5A, if based on inputs thereto the controller 30 identifies a vehicle passing the driver's vehicle within the comfort zone 84, the controller 30 can be configured to instruct the ISAD 40 to display an alert 112A in the comfort zone 84 corresponding to an approximate location of the passing vehicle relative to the driver's vehicle, such as at a left rear of the vehicle icon 82 as illustrated in FIG. 5A. If the controller 30 determines that the passing vehicle has moved to a side of the driver's vehicle, such as a left hand side, the controller 30 can be configured to instruct the ISAD 40 to display an alert 112B to a left of the vehicle icon 82, as illustrated in FIG. 5B. With reference to FIG. 5C, the controller 30 can instruct the ISAD 40 to display an alert 112C at a front left of the vehicle icon 82 when the controller 30 identifies the passing vehicle at a front left of the driver's vehicle based on inputs to the controller 30. The alerts 112A-112C can be of a color and/or intensity representing the distance that the passing vehicle is from the driver's vehicle. For example, and similar to the alerts 110A-110C described above, the alerts 112A-112C can each be green, yellow, or red depending on whether the passing vehicle is at a relatively far, intermediate, or close distance within the comfort zone 84. The alerts 112A-112C can also be of varying intensities corresponding to the distance of the passing vehicle, such that the greater the intensity of the alert 112A-112C, the closer the passing vehicle is to the driver's vehicle.

With reference to FIG. 6A, if based on inputs thereto the controller 30 identifies a vehicle at a rear of the driver's vehicle within the comfort zone 84, the controller 30 can instruct the ISAD 40 to generate an alert 114A illuminating a portion of the comfort zone 84 at a rear of the vehicle icon 82. The color and/or intensity of the alert 114A can vary based on the proximity of the following vehicle as described above. For example, and as illustrated in FIG. 6A, the alert 114A can be a first degree alert 114A of a low intensity and/or can be illuminated in the color green. As the following vehicle moves closer to the driver's vehicle, a second degree alert 114B can be displayed as illustrated in FIG. 6B. The second degree alert 114B can be yellow, for example, and/or can be illuminated at a relative medium intensity. With reference to 6C, when the following vehicle moves yet closer to the driver's vehicle and enters the comfort zone 84 the controller 30 can instruct the ISAD 40 to generate a third degree alert 114C in the comfort zone 84 and a tailgating alert 116 in the rear safety zone 94. The third degree alert 114C can be illuminated in red and/or be of a greater intensity than the first degree and second degree alerts 114A and 114B. The tailgating alert 116 can be any suitable color intensity, such as a high intensity color red, which can be the same as or greater than the third degree alert 114C, for example.

With reference to FIG. 7A-7C, based on inputs to the controller 30, the controller 30 can instruct the ISAD 40 to generate alerts 110A-110C representing encroachment of the forward safety zone 86 by a vehicle ahead of the driver's vehicle. For example, FIG. 7A illustrates an alert 120A within the comfort zone 84 ahead of the vehicle icon 82 representing the vehicle ahead of the driver's vehicle within the comfort zone 84. FIG. 7B illustrates an alert 120B at the distal forward safety zone 86A representing movement of the vehicle into the forward safety zone 86 of the driver's vehicle. FIG. 7C illustrates an alert 120C at the medial forward safety zone 86B indicating that the vehicle ahead has moved yet closer to the driver's vehicle. The alerts 120A-120C can be of varying colors and/or intensities relative to the distance between the driver's vehicle and the vehicle ahead, similar to that described above.

With reference to FIGS. 8A, 8B, and 8C, the ISAD 40 can be configured to display, and the controller 30 can be configured to drive/instruct the ISAD 40 to display, a vehicle icon 130 when the vehicle ahead of the driver's vehicle icon 82 moves within the forward safety zone 86 in order to help the driver visualize the potential safety issue. The vehicle icon 130 is illustrated for exemplary purposes only. Thus the vehicle icon 130 can be replaced with any other icon representing the potential safety issue, such as a pedestrian, construction barrier, or any other object. Thus FIG. 8 is generally the same as FIG. 7A, and the alert 120A is provided at the comfort zone 84 representing an object ahead of the driver's vehicle within the comfort zone 84. As the object enters the forward safety zone 86 the alert 120B is displayed as illustrated in FIG. 8B. In addition to the alert 120B, the vehicle icon 130 is displayed within the distal forward safety zone 86A representing the position of the vehicle ahead. As illustrated in FIG. 8C, as the vehicle ahead moves within the medial forward safety zone 86B, both the vehicle icon 130 and the alert 120C are displayed at the medial forward safety zone 86B.

With reference to FIGS. 9A-9C, when based on inputs to the controller 30 the controller 30 identifies a vehicle to the side of the driver's vehicle, such as to the left hand side of the driver's vehicle within the comfort zone 84, the controller 30 can be configured to instruct the ISAD 40 to generate an alert 140A in the confront zone 84 at a location thereof corresponding to the detected location of the vehicle relative to the driver's vehicle. The alert 140A can be any suitable color and/or intensity representing location of the vehicle within the comfort zone 84 relative to the driver's vehicle, such as described above. As illustrated in FIG. 9B, when the controller 30 detects that the vehicle has encroached the driver's safety zone, the controller 30 can be configured to instruct the ISAD 40 to generate an alert 140B corresponding to the location of the vehicle within the safety zone, such as at the left safety zone 90B if the vehicle is to the left of the driver's vehicle. As illustrated in FIG. 9C, if the controller 30 determines based on inputs thereto that the vehicle is encroaching into the driver's lane, the controller 30 can be configured to instruct the ISAD 40 to display a vehicle icon within the left safety zone 90B. The icon 130 is illustrated as a vehicle for exemplary purposes only, and can be any suitable icon corresponding to the object encroaching the driver's lane. The alerts 140A and 140B, as well as the vehicle icon 130, can be displayed to the right of the vehicle icon 82 to represent a vehicle or other object encroaching the driver's lane from the right hand side.

With reference to FIGS. 10A-10C, if the controller 30, based on inputs thereto, identifies a vehicle or other object within the driver's blind spot, the controller 30 can be configured to instruct the ISAD 40 to generate an alert 142A in the comfort zone 84 and an alert 144A within the comfort zone 84 corresponding to the location of the vehicle relative to the vehicle icon 82. For example and as illustrated in FIG. 10A, if the vehicle is within the driver's left blind spot, alert 142A can be at a left rear relative to the vehicle icon 82 and the alert 144A can be within the left blind spot safety zone 92B. The alerts 142A and 144A can be of any suitable color and/or intensity representing the relative distance between the driver's vehicle and the vehicle in the blind spot. For example and as illustrated, the alerts 142A and 144A can be at a low intensity when the vehicle is at a relatively far distance from the driver's vehicle. With reference to FIG. 10B, alerts 142B and 144B can be of an intensity greater than the alerts 142A and 144A when the distance between the driver's vehicle and the vehicle in the driver's blind spot decreases. With reference to FIG. 10C, alerts 142C and 144C of yet a greater intensity can be displayed when the gap between the driver's vehicle and the vehicle in the blind spot becomes even smaller. Similar to the alerts described above, the alerts 142A-142C and 144A-144C can be the same color or different colors. For example, the alerts 142A and 144A can be illuminated in green, the alerts 142B and 144B can be illuminated in yellow, and the alerts 142C and 144C can be illuminated in red. The alerts 142A-142C and 144A-144C can also be the same color, such as red, but of different intensities as described above.

With reference to FIGS. 11A-11C, the controller 30 may be configured to command the ISAD 40 to move the vehicle icon 82 relative to the right and left lane markers 88A and 88B in response to one or more inputs from the lane departure detection system 18 indicating that the driver's vehicle is moving toward the right or left lane markers 88A and 88B in a manner indicating that the driver's vehicle is about to depart from within its current lane. For example, FIG. 11A illustrates the vehicle icon 82 of the driver's vehicle at a first position 82A in which the vehicle icon 82 is at a center of the current lane of travel in response to the lane departure detection system 18 informing the controller 30 that the driver's vehicle is within its current lane. With reference to FIG. 11B, in response to inputs from the lane departure detection system 18 indicating that the driver's vehicle is moving toward the left lane marker 88B, the controller 30 instructs the display ISAD 40 to move the vehicle icon 82 to a second position 82B in which the vehicle icon 82 is moved towards the left lane marker 88B. Upon receiving inputs from the lane departure detection system 18 indicating that the driver's vehicle has moved further to and/or crossed the left lane marker 88B, the controller 30 instructs the ISAD 40 to move the vehicle icon 82 to a third position 82C in which the vehicle icon 82 is yet even closer to the left lane marker 88B, and the controller 30 instructs the ISAD display 40 to display an alert 146 at the left safety zone 90B, which indicates that the driver's vehicle is about to cross over the left lane marker 88B and into the left safety zone 90B. If the controller 30 is informed by the lane departure detection system 18 that the driver's vehicle is moving towards the right lane marker 88A, the controller 30 can instruct the ISAD 40 to move the vehicle icon 82 towards and to the right lane marker 88A and display an alert at the right safety zone 90A in a similar manner.

FIGS. 11A-11C illustrate the ISAD 40 displaying a lane departure warning by moving the vehicle icon 82. However, the vehicle icon 82 may remain stationary with the surrounding landscape moving, as illustrated in FIGS. 12A-12C. Specifically, FIG. 12A illustrates the vehicle icon 82 at a center of its current lane. If the lane departure detection system 18 informs the controller 30 that the driver's vehicle is moving towards the left lane marker 88B, the area within the comfort zone 84 can be shifted to the right, while the vehicle icon 82 is kept stationary, in order to illustrate the vehicle icon 82 as moving towards the left lane marker 88B. Therefore, the left safety zone 90B will become enlarged, as illustrated in FIG. 12B at 90B', and the right safety zone 90A will decrease in size, as illustrated at 90A'. With reference to FIG. 12C, the controller 30 can instruct the ISAD 40 to display an alert 146 at the left safety zone 90B in response to inputs received from the lane departure detection system 18 indicating that the driver's vehicle has moved yet further towards the left lane marker 88B. The alert 146 can be any suitable color or intensity. In a similar manner, upon receipt of inputs from the lane departure detection system 18 indicating that the driver's vehicle has moved towards the right lane marker 88A, the controller 30 can instruct the ISAD display 40 to shift the landscape to the left such that the left safety zone 90B decreases in size and the right safety zone 90A increases in size.

With reference to FIGS. 13A-13C, the controller 30 can be configured to instruct the ISAD 40 to display alerts only when an obstacle is within the driver's safety zone, such as within the forward safety zone 86, the right safety zone 90A, the left safety zone 90B, the right or left blind spot safety zones 92A/92B, and the rear safety zone 94. Therefore, the controller will not instruct the ISAD display 40 to issue alerts when an obstacle is within the comfort zone 84. As illustrated in FIG. 13A, for example, when the controller 30 identifies the presence of another vehicle within the forward safety zone 86, based on inputs to the controller, the controller 30 instructs the ISAD 40 to display a primary alert 152A at the distal forward safety zone 86A, and display the vehicle icon 130 at the distal forward safety zone 86A. The controller 30 may also be configured to display a primary alert 150A in the comfort zone 84 ahead of the vehicle icon 82 representing the driver's vehicle, even though the controller 30 has determined that the vehicle of interest is already within the forward safety zone 86. With reference to FIG. 13B, upon being informed by inputs thereto that the vehicle of interest has moved to the medial forward safety zone 86B, the controller 30 can instruct the ISAD 40 to display the secondary alert 150B in the comfort zone 84, a secondary alert 152B at the medial forward safety zone 86B, and move the vehicle icon 130 representing the vehicle of interest to the medial forward safety zone 86B. The secondary alerts 150B and 152B can be different colors than, and/or different intensities than, the primary alerts 150A and 152B. With reference to FIG. 13C, when the controller 30 determines that the vehicle of interest has moved to the proximate forward safety zone 86C, the controller 30 can instruct the ISAD 40 to display a tertiary alert 150C in the comfort zone 84, as well as a tertiary alert 152C at the proximate forward safety zone 86C. The tertiary alert 152C may also include the distal and medial forward safety zones 86A and 86B as illustrated in FIG. 13C. The vehicle icon 130 can be moved to the proximate forward safety zone 86C. The primary, secondary, and tertiary alerts 150A-150C and 152A-152C can have the same colors and/or intensities, or different colors and/or intensities representative of the proximity of the obstacle.

The ISAD 40 illustrated and described above is merely an exemplary ISAD. The ISAD 40 may take any suitable form and may be displayed in any suitable manner. For example, although the ISAD 40 is generally a three-dimensional display taken from an area behind the vehicle icon 82, the ISAD 40 may be a generally two-dimensional display taken from above the vehicle icon 82, as illustrated in FIG. 14 at reference numeral 210.

The present teachings thus improve driver situational awareness and help drivers develop strategies to enhance safety, such as by: (1) using graphics and animation on the dashboard display 52, or any other suitable display such as a driver's smart device display, which generally matches a driver's mental model of the roadway; and (2) integrating sensor information, roadway information, and vehicle status to provide a high level understanding of surrounding obstacles and traffic.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for informing a driver of a vehicle of a surrounding hazard and road position of the vehicle comprising:
   at least one sensor configured to identify location of the hazard relative to the vehicle; and
   a controller configured to:
      receive inputs from the at least one sensor regarding location of the hazard;
      determine a threat potential of the hazard based on at least one of location of the hazard relative to the vehicle, speed of the vehicle, and heading of the vehicle;
      send commands to a display for visually displaying the hazard to the driver based on the determined threat potential of the hazard;
      determine position of the hazard relative to a first zone defined about the vehicle by the controller and a second zone defined about the vehicle by the controller, the second zone is between the first zone and the vehicle;
      display the second zone as surrounding the first zone;
      display the hazard on the display relative to at least one of the first zone and the second zone; and
      illuminate a portion of the first zone corresponding to location of the hazard relative to the vehicle, and vary at least one of the intensity and color of the illumination relative to a determined threat potential of the hazard.

2. The system of claim 1, wherein the controller is further configured to send commands to the display for visually displaying location of the vehicle relative to lane lines of the roadway, and vary position of the vehicle relative to the lane lines when the vehicle moves towards one of the lane lines.

3. The system of claim 1, wherein the at least one sensor includes at least one of the following: a proximity sensor, a vehicle-to-vehicle sensor, a lane departure detection sensor, a vehicle position sensor, a heading sensor, and a speed sensor.

4. The system of claim 1, further comprising a receiver configured to receive at least one of road conditions, traffic conditions, or data representing location of at least one of the hazard or the driver's vehicle; and
   wherein the controller is further configured to determine the threat potential of the hazard based on inputs from the receiver.

5. The system of claim 1, wherein the controller is configured to highlight areas of the first zone and the second zone as displayed on the display with at least one of a color code or graphic icon based on location and determined threat potential of the hazard.

6. A system for informing a driver of a vehicle of a surrounding hazard and road position of the vehicle comprising:
   a plurality of sensors configured to sense at least one of hazards or location of the vehicle on a roadway;
   a receiver configured to receive at least one of road conditions, traffic conditions, or data representing location of at least one of the hazard or the driver's vehicle; and
   a controller configured to:
      receive inputs from at least one of the plurality of sensors or the receiver;
      determine a threat potential of the hazard based on at least one of location of the hazard relative to the vehicle, speed of the vehicle, and heading of the vehicle;
      send commands to a display for visually displaying the hazard to the driver based on the determined threat potential of the hazard; and
      send commands to the display to visually display location of the vehicle relative to lane lines on the roadway;
   wherein the display includes graphics representing the driver's vehicle, lane markers, blind spots, a comfort zone surrounding the vehicle, and a safety zone about the vehicle between the graphic representing the driver's vehicle and the comfort zone;
   wherein the controller is further configured to display the hazard on the display relative to at least one of the comfort zone and the safety zone; and
   wherein the controller is configured to illuminate a portion of the comfort zone corresponding to location of the hazard relative to the vehicle, and vary at least one of the intensity and color of the illumination relative to a determined threat potential of the hazard.

7. The system of claim 6, wherein the plurality of sensors include at least one of the following: a proximity sensor, a vehicle-to-vehicle sensor, a lane departure detection sensor, a vehicle position sensor, a heading sensor, and a speed sensor.

8. The system of claim 6, wherein the receiver is at least one of a satellite radio receiver, a GPS receiver, or a ground-based radio receiver.

9. The system of claim 6, wherein the display is an integrated situation awareness display.

10. The system of claim 6, wherein the controller is configured to monitor driving habits of the driver for use in determining the threat potential.

11. The system of claim 6, wherein the display is at least one of a dashboard display and a heads-up display.

12. The system of claim 6, wherein the display is included with a mobile device.

13. The system of claim 6, wherein the controller is configured to highlight areas of the display with at least one of a color code or graphic icon based on location and determined threat potential of the hazard.

14. The system of claim 6, wherein the controller is configured to command the display to display a colored alert when the hazard is in a potentially unsafe location relative to the vehicle.

15. The system of claim 6, wherein the controller is configured to command the display to display a colored alert inside the safety zone when the hazard enters the safety zone of the driver and presents a high safety threat to the vehicle, including when a gap between the driver's vehicle and a vehicle ahead of the driver's vehicle is smaller than a critical value.

16. The system of claim 6, wherein the controller is configured to command the display to display a colored alert inside at least one of the displayed blind spots when a hazard appears in the driver's blind spot and presents a safety threat to the driver.

17. The system of claim 6, wherein the controller is configured to command the display to display a colored alert representing a change in position of the vehicle relative to lane lines on the roadway.

18. A method for displaying surrounding hazards to a driver of a vehicle and a threat potential of the surrounding hazards, the method comprising:
   determining locations of the surrounding hazards relative to the vehicle;
   determining a threat potential of each of the surrounding hazards to the driver;
   filtering the surrounding hazards based on threat potential;
   displaying only the surrounding hazard or hazards that have the greatest threat potential to the driver on a display;
   highlighting areas of the display with at least one of a color code or a graphic icon based on location and determined threat potential of the surrounding hazard or hazards;
   displaying a first alert at a first position inside a circle or oval displayed surrounding a graphic of the vehicle when a hazard enters a first predetermined zone defined about the vehicle, the first alert displayed at a first intensity or color keyed to a threat level of the hazard, the first alert located at a location about the graphic of the vehicle corresponding to location of the hazard, varying at least one of intensity and color of the first alert relative to a determined threat potential of the hazard; and
   displaying a second alert closer to the graphic of the vehicle than the first alert when the hazard enters a second predetermined zone defined about the vehicle that is closer to the vehicle than the first predetermined zone, the second alert displayed at a second intensity greater than the first intensity or a second color different than the first color keyed to a threat level of the hazard, the second alert at a location about the graphic of the vehicle corresponding to location of the hazard.

19. The system of claim 1, wherein the first zone is displayed on the display as a circle that surrounds an image of the vehicle and encompasses traffic lanes displayed on the display to the left and right of the image of the vehicle; and
   wherein the controller is configured to modify size of the first zone based on capabilities of the driver.

20. The system of claim 6, wherein the controller is configured to vary position of the displayed driver's vehicle relative to the lane markers when the driver's vehicle moves towards one of the lane markers.

21. The method of claim 18, further comprising varying position of the displayed vehicle relative to lane lines displayed on the display when the vehicle moves towards one of the lane lines.

\* \* \* \* \*